US011232695B1

(12) United States Patent
Hausler

(10) Patent No.: US 11,232,695 B1
(45) Date of Patent: Jan. 25, 2022

(54) POOL MONITOR

(71) Applicant: Graham Speier Hausler, Bend, OR (US)

(72) Inventor: Graham Speier Hausler, Bend, OR (US)

( * ) Notice: Subject to any disclaimer, the term of this patent is extended or adjusted under 35 U.S.C. 154(b) by 0 days.

(21) Appl. No.: 17/013,572

(22) Filed: Sep. 5, 2020

(51) Int. Cl.
| | |
|---|---|
| *G08B 21/08* | (2006.01) |
| *H04N 7/18* | (2006.01) |
| *G08B 5/38* | (2006.01) |
| *G03B 17/08* | (2021.01) |
| *G08B 3/10* | (2006.01) |

(52) U.S. Cl.
CPC ........... *G08B 21/082* (2013.01); *G03B 17/08* (2013.01); *G08B 3/10* (2013.01); *G08B 5/38* (2013.01); *G08B 21/084* (2013.01); *H04N 7/183* (2013.01)

(58) Field of Classification Search
CPC .............. G08B 21/0476; G08B 21/088; G08B 21/084; G08B 21/08; E04H 4/06; G01S 15/04
See application file for complete search history.

(56) References Cited

U.S. PATENT DOCUMENTS

| | | | | |
|---|---|---|---|---|
| 10,665,073 | B1* | 5/2020 | Richerson, Jr. ...... | H04N 5/2254 |
| 10,878,684 | B1* | 12/2020 | Eller ......................... | E04H 4/06 |
| 11,004,324 | B1* | 5/2021 | Sanchez Henares . | H02J 7/0048 |
| 2016/0119065 | A1* | 4/2016 | Tobias ................... | H04B 13/02 348/81 |
| 2019/0287378 | A1* | 9/2019 | Rogers ................... | H04N 5/232 |
| 2020/0311227 | A1* | 10/2020 | Bennett ................. | H04L 67/025 |

* cited by examiner

*Primary Examiner* — Mirza F Alam
(74) *Attorney, Agent, or Firm* — Mark S. Hubert

(57) ABSTRACT

A battery powered do-it-yourself (DIY) swimming pool sensor and alarm unit that is removably mounted in a floating assembly. The sensor monitors movement in the pool and around the pool deck and provides remote video alerts to designated cell phones as well as a localized audible and visual alarm when motion is detected. It has an above waterline camera and a below waterline camera that provides a video feed for further remote investigation. It utilizes a float stabilizing means to ensure the floating assembly is not capsized by large waves or wind. It cannot be defeated because of its floating location, and can be simply installed and set up by the average homeowner. Optionally, it has sensors that monitor the pool water's chemistry and provides the results to an owner's cell phone or to a remote chemical dispensing unit located at the pool.

8 Claims, 9 Drawing Sheets

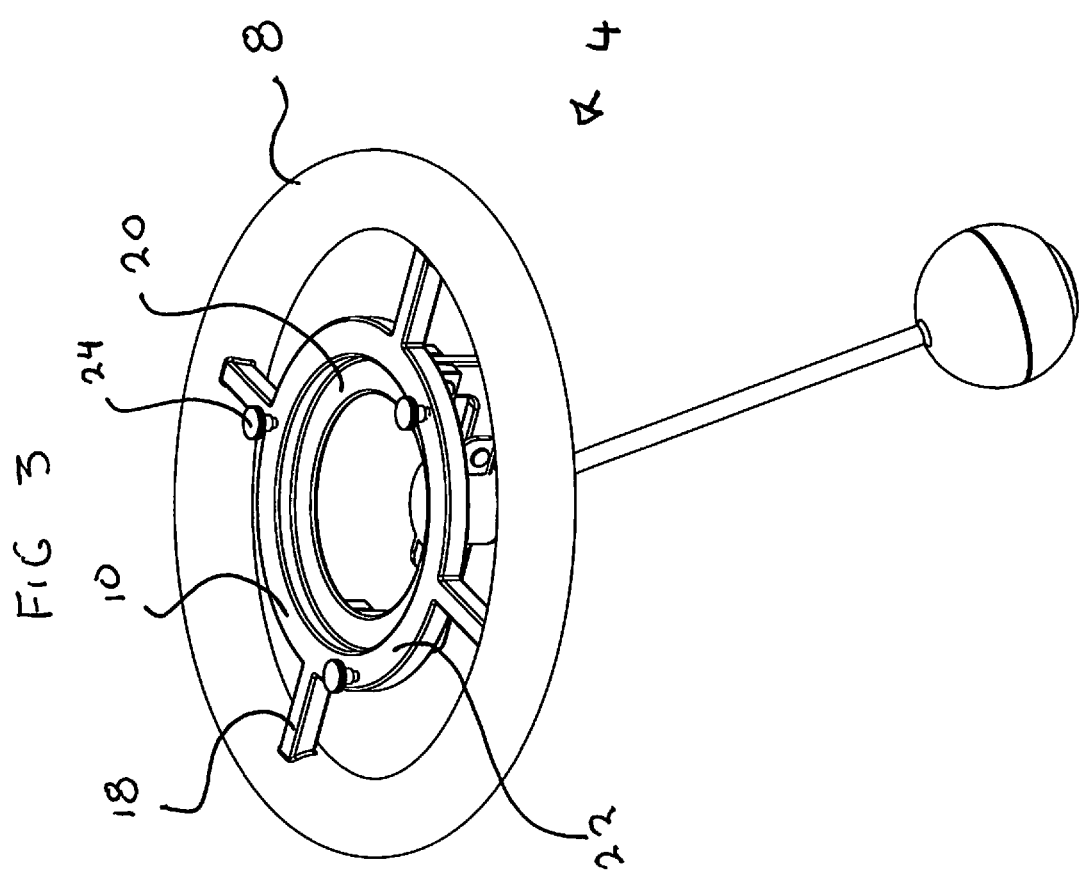

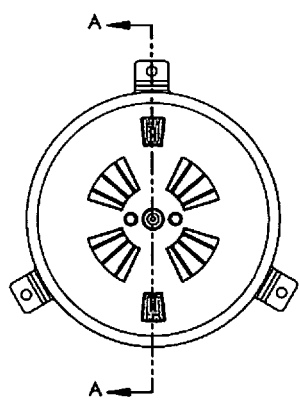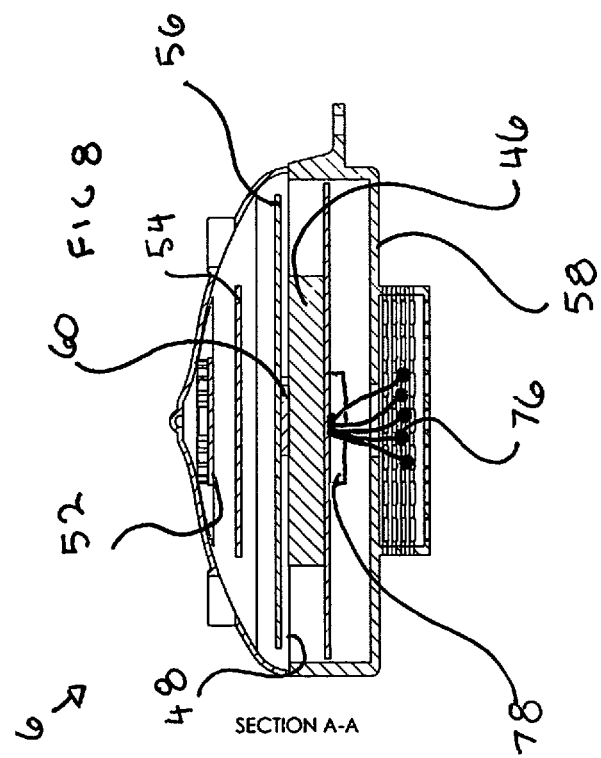

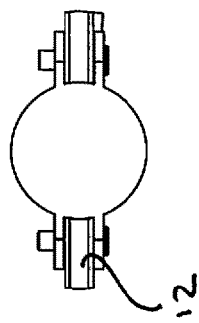
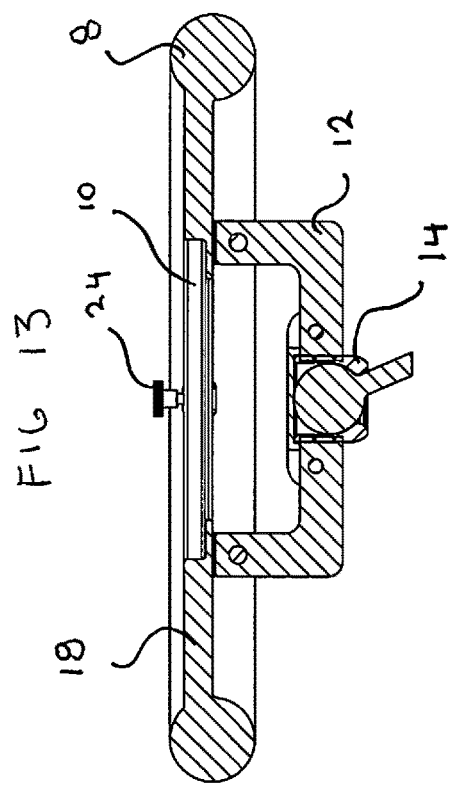
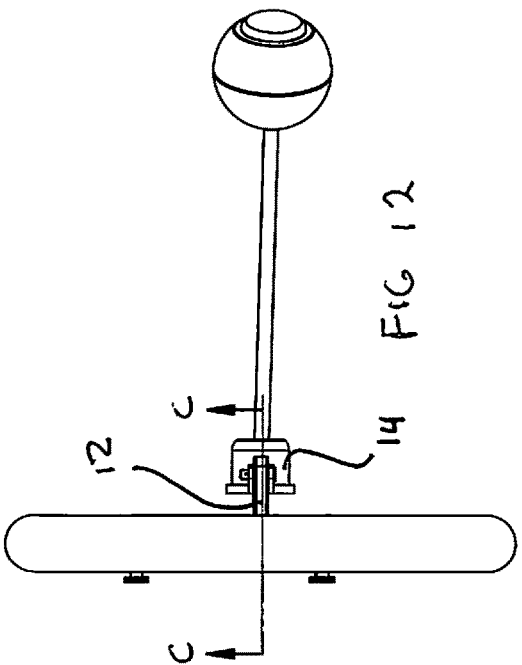
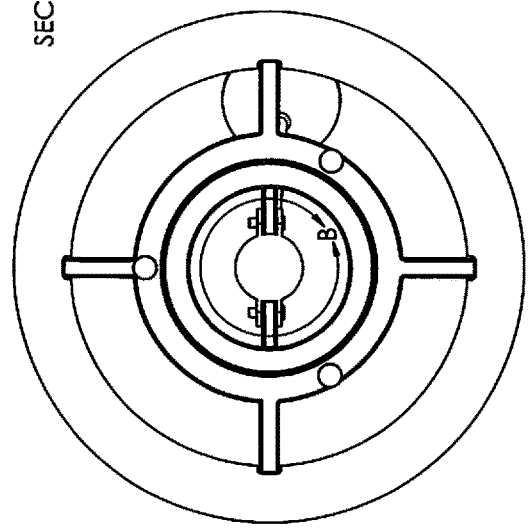

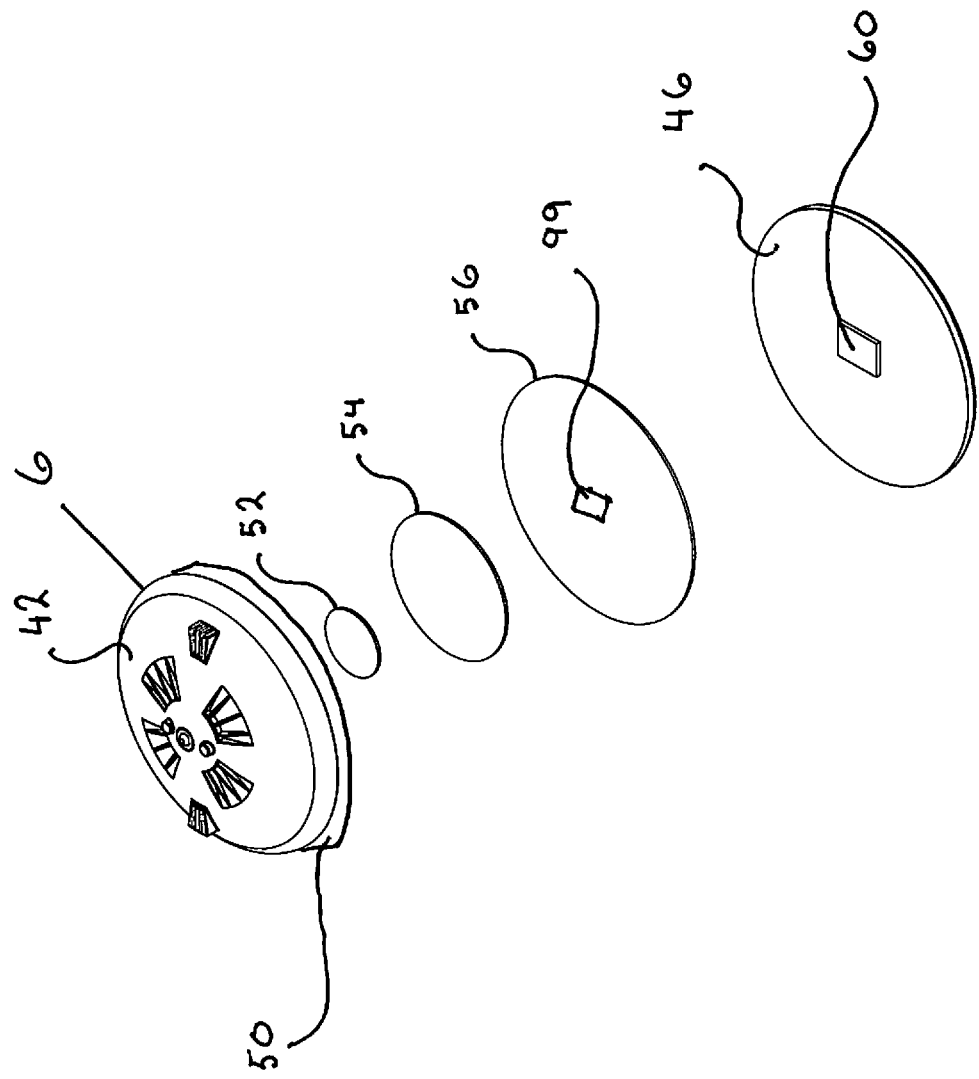

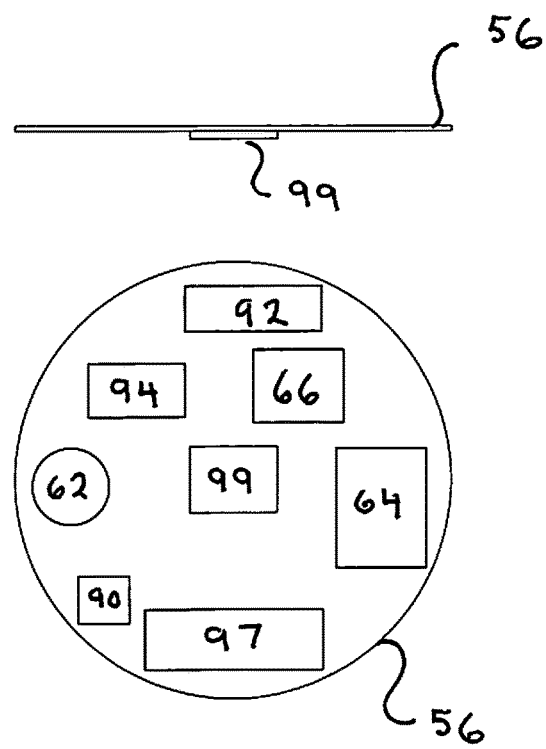
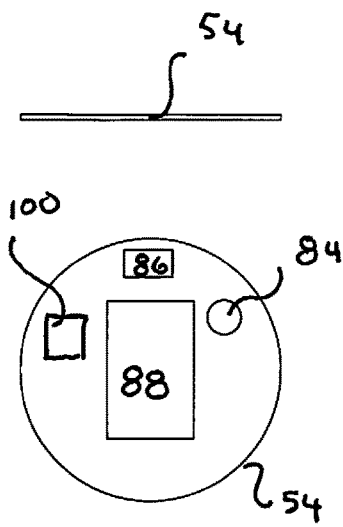
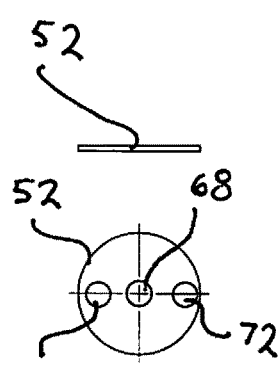

POOL MONITOR

FIELD

The present disclosure relates, in general, to safety and security alarm systems, and more particularly to a swimming pool monitoring device that provides security and safety technology.

BACKGROUND 5,100,000 or approximately 4.2% of all American homes have swimming pools. This is much higher for hotels with 36% having indoor swimming pools and 43% having outdoor swimming pools.

Of concern to all pool owners is the knowledge that when they or a lifeguard are not present, the pool is safe and more importantly, there is no chance that there will be an inadvertent pool accident resulting in death or disability.

The standard for pool security is a 6 foot high fence with a lockable gate as well as a set of warning poster. The problem is that these are, at best, just non-notifying barriers. Once defeated or bypassed their security and safety benefits end.

What is needed is a pool safety and security system that takes proactive measures of notification when the potential for accidents has risen beyond a threshold value. There are remote camera systems at some of the finer establishments but these are expensive to purchase, install, maintain and monitor. These systems can also be defeated because they are generally located in arms reach about the pool deck. There is no inexpensive, do-it-yourself pool and security system that keeps the owners abreast of the status in or about the pool, or allows remote checking.

Henceforth, a safety and security alarm capable of providing notification that the status has change in or around a swimming pool would fulfill a long felt need in the pool industry. This new invention utilizes and combines known and new technologies in a unique and novel configuration to overcome the aforementioned problems and accomplish this. Thus, a more informative swimming pool status notification solution is provided by the embodiments set forth below.

BRIEF SUMMARY

In accordance with various embodiments, a swimming pool security and safety system with a floatable sensor capable of providing remote video alerts to designated cell phones as well as a localized audible and visual alarm is provided.

In one aspect, a pool security system that is inexpensive, needs no wiring, cannot be defeated because of its floating location, can be installed and set up by the average homeowner is provided.

In another aspect, a pool sensor and alarm that can monitor the pool water's chemistry looking at some or all of the following parameters: pH, total alkalinity, free Cl, residual Cl, Ca hardness, Cyanuric Acid, Cu, Fe, and NaCl and send the test results via an application to an owner's cell phone or personal computing device for notification or action via a remove chemical dispensing unit.

In yet another aspect, a pool safety and security system that can send alerts on potentially dangerous conditions before anyone of anything has entered the pool.

In a final aspect, a pool sensor and alarm that utilizes an above and a below the waterline camera adapter for sending video feeds of the status above and below the surface of the pool when certain conditions are met.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 3 is a perspective view of the float assembly;

FIG. 7 is a top view of the pool sensor showing section line A-A;

FIG. 8 is a cross sectional view through sectional line A-A;

FIG. 11 is a bottom view of the float assembly without the counterweight assembly;

FIG. 12 is a view of the float assembly showing section line C-C;

FIG. 13 is a cross sectional view through sectional line C-C;

FIG. 14 is a top view of the counterweight support;

FIG. 16 is an exploded view of the shell and its components;

FIG. 17 is a side view of the bottom PCB;

FIG. 18 is a top view of the bottom PCB;

FIG. 19 is a side view of the middle PCB;

FIG. 20 is a top view of the middle PCB; and

FIG. 21 is a side view of the top PCB; and

FIG. 22 is a middle view of the top PCB.

DETAILED DESCRIPTION OF CERTAIN EMBODIMENTS

Figure 1:
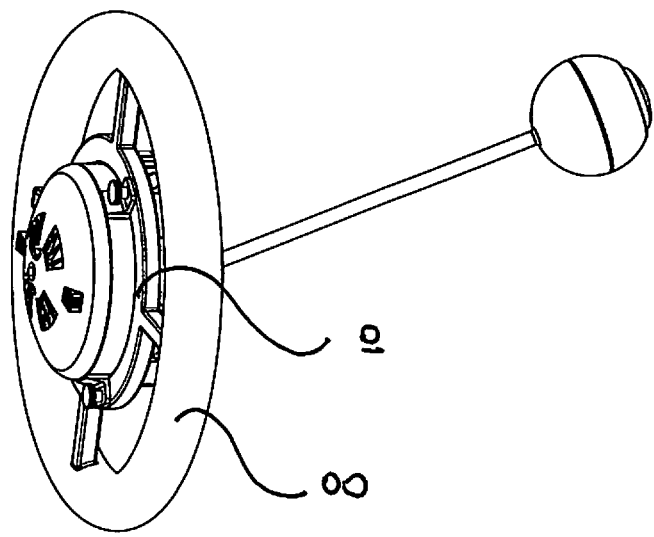
FIG. 1 is a perspective view of the pool sensor and float assembly.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the terms "owner" or "homeowner" refer to the entity responsible for monitoring the pool be it the actual legal owner, a remote monitoring service, personnel/neighbors nearby the pool's location or any combination thereof. Although discussed herein with all alerts/notifications being sent to the owner, it is known that it is likely that a remote pay-for-monitoring service will be employed.

As used herein, the terms "pool sensor and alarm unit" and "sensor" refer to an electronic device or combination of electronic devices used for monitoring and/or reporting of conditions around and in a swimming pool or body or water. These include IR or heat proximity sensors, motion detectors, above water and underwater 360 degree fisheye cameras, audio and video communication, microphones, speakers, alarms, lights, and water chemistry sensors, including all of their operational electronic components including but not limited to microprocessors, batteries, power convertors, battery power monitoring circuitry and microprocessor, cellular network modules, wireless transceivers, mesh network modules, cellular transmitters and video modules.

As used herein, the term "data" and "signal" are equivalent and interchangeable and mean digital data and control signals conveyed as a pulse or frequency of electricity that over a network, a computer channel or wirelessly.

A used herein, the term "smart device" is synomonous with smart phone, tablet, personal computing devices and the equivalent.

The present invention relates to a novel design for a pool monitor made of a sensor and alarm device (sensor) nested in a non-tippable float for a swimming pool. The main novelty resides in the fact that this pool security and safety device operates from a float assembly in the swimming pool, making it hard for intruders to circumvent. With its heat and motion sensor it can detect and send alerts as soon as a warm body enters the immediate area surrounding the pool. Hopefully, alerting the owner before there is entry by the person/animal/reptile into the pool. When these sensors detect a body near the pool, they will trigger video and audio feeds which will be sent via cellular communication to the owner's cell phone for verification. In response, the owner can initiate two-way communication through the speaker on the sensor unit. There is also an underwater camera capable of remote video feed.

It also has chemical sensors that monitor the pool's chemistry and relays this data back to a chemical disbursement unit located at the pool. This data is logged into an application on the owner's phone so that the water chemistry trending can be examined for larger pool problems such as leaks or algae buildup.

Since the device is battery powered, (including the underwater camera assembly) installation is as simple as placing it in the pool and installing a web available application onto the owner's cell phone/computer/personal computing device. Maintenance is as simple as occasionally changing/charging the battery pack and cleaning the camera lenses. Thus, it can be installed and set up by an unskilled person.

Figure 2:
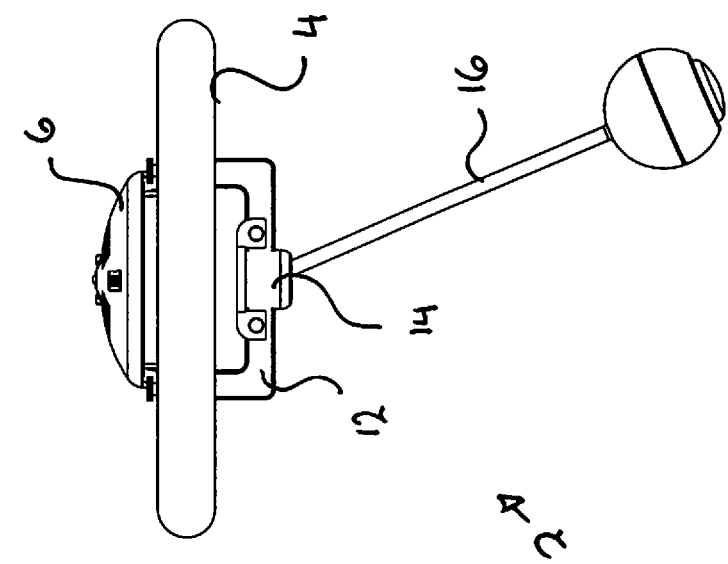
FIG. 2 is a side view of the pool sensor and float assembly.

Looking at FIGS. 1 and 2 it can be seen that the pool monitor 2 is made of a float assembly 4 and a sensor and alarm unit 6 removably located within the top of cradle 10 centered in the float ring 8. From the bottom of the cradle 10 extends a linear mounting bracket 12 that extends across the cradle and is parallel with a centerline of the cradle 10. In the middle of the mounting bracket 12 and centered beneath the cradle 10 is a socket 14 that holds the float stabilization means 16 that prevents the float assembly 4 from tipping over and rights the float assembly if it does.

FIG. 3 in conjunction with FIGS. 10-15 illustrate the float assembly 4 in detail. The float ring 8 is essentially a life preserver ring made of a water impervious polymer having a density much less than water. Although depicted as a circular ring, it could take on other geometrical configurations, its primary function being to float and maintain the cradle 10 with the sensor 6 on the surface of the pool. Such devices are well known in the industry. Imbedded into the float ring 8 are four arms 18 disposed at 90 radial degrees from each other, that extend from the cradle 10 and hold the circular cradle 10 centered within the float ring 8. The cradle 10 has a central circular ring 22 and a recessed circular support flange 20 below the top of the ring 9 (FIG. 2) and centered within the ring 22. In the inner side of the surface of the ring are three threaded imbeds that matingly engage three mechanical fasteners 24, preferably thumbscrews, for ease of installation and removal. These three thumbscrews pass through orifices in the three attachment tabs 26 extending normally from the periphery of the pool sensor and alarm unit 6 to lock the sensor and alarm unit 6 to the cradle 10 in the float assembly 4. (See FIG. 4)

Extending downward from two of the opposing arms 18 of the cradle 10, is a U-shaped mounting bracket 12 and ball socket 14. A cap 28 extends over the top of the ball socket 14 and seals the upper end of the float assembly stabilization means 16 therein the socket 14. The cap 28 has two pairs of parallel tabs 30 extending from its periphery at 180 radial degrees apart. These have orifices formed therethrough that align with orifices in the mounting bracket 12 through which a pair of locking pins 32 may be inserted and locked in place with rings or lock wires fit through orifices in the ends of the locking pins 32. This ensures the cap 28 will not detach and allow the possible release of the float assembly stabilization means 16 from the ball socket 14.

From the ball socket 14 hangs the float assembly stabilization means 16. This is a weighted assembly with an upper sphere 34 connected to a counterweight 36 by a weighted linear member 28, preferably a steel rod. The counterweight 26 has a mass greater than the mass of the upper sphere 34 and in the preferred embodiment it also has a spherical configuration although other geometric shapes may be used. The weighted linear member 28 may be solid or hollow although solid is preferred. Weighted refers to the fact that the rod 28 is preferably made of a metal/steel or is a polymer tube filled with water or a filler material having a density greater than water.

On the bottom half of the counterweight sphere 36 is a 360-degree underwater camera assembly 38. This assembly contains its own battery, camera, wireless transmitting module and processor such that upon initiation from the monitor's central microprocessor 100 via the underwater camera video module 88 (with its wireless transceiver dedicated for wireless communication with the underwater camera assembly), it can wirelessly present a video feed of a 360 degree view below the pool's waterline to the central microprocessor 100 for further distribution to the owner's smartphone or a remote computer. The float assembly stabilization means 16 acts as a weighted keel does on a racing sailboat to apply a counterforce to stabilize and right the float assembly as it encounters waves. The ball socket 14 has an orifice 40 formed through its bottom that is larger in diameter than the diameter of the weighted rod 28 but less than the diameter of the upper sphere 34. In this configuration the float assembly stabilization means 16 is free to hang vertically below the midpoint of the cradle 10, minimizing the roll and pitch of the float ring 8. The float assembly stabilization means is thus pivotally and rotationally suspended, centered below the float assembly 4 and sensor and alarm unit 6. Although depicted as a pair of simple spheres joined by a linear member, it is known that other geometric configurations of this weighted keel may be used depending on the amount of stabilization needed. (It is to be noted that image stabilization circuitry and software are used in the sensor and underwater camera circuits to maximize the viewability of the video feed.)

Moving now to FIGS. 4-10 it can be seen that the pool sensor and alarm unit 6, incorporates a multitude of video and audio communication devices, as well as security and safety sensors and pool chemistry sensors into a comprehensive monitoring unit. The pool sensor and alarm unit 6 will operate without a tactile control panel or keypad, rather the entire system will be controlled with a downloaded, custom built control application for the homeowner's cell phone/mobile device or computer. From this application the homeowner will be able to access the monitor microprocessor in the sensor and alarm unit 6 and control many of the sensor features such as the video feeds from sensor camera and the underwater camera 38 as well as the two-way audible communication system 66 and the audio and visual alarms.

Figure 5:
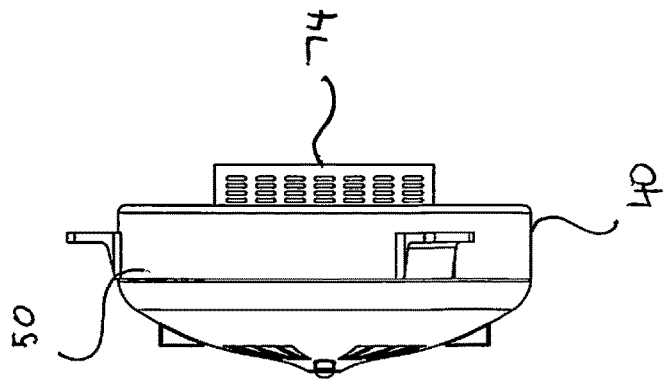
FIG. 5 is a front side view of the pool sensor.
Figure 6:
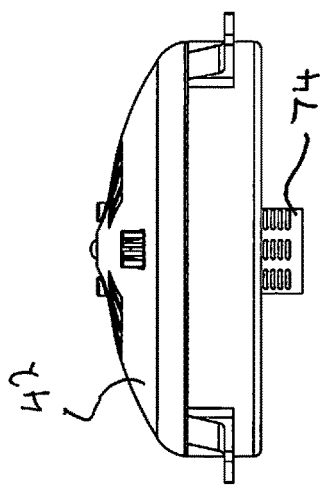
FIG. 6 is a back-side view of the pool sensor.
Figure 4:
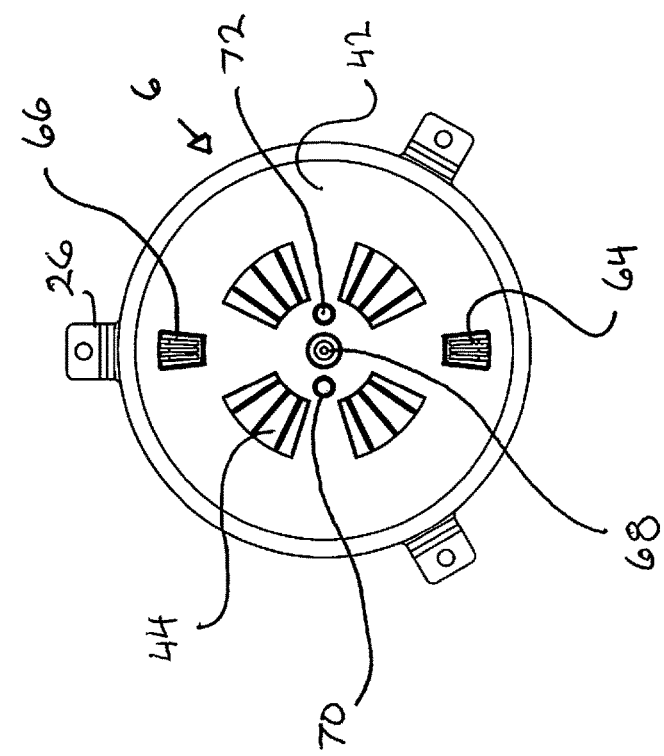
FIG. 4 is a top view of the pool sensor.
Figure 10:
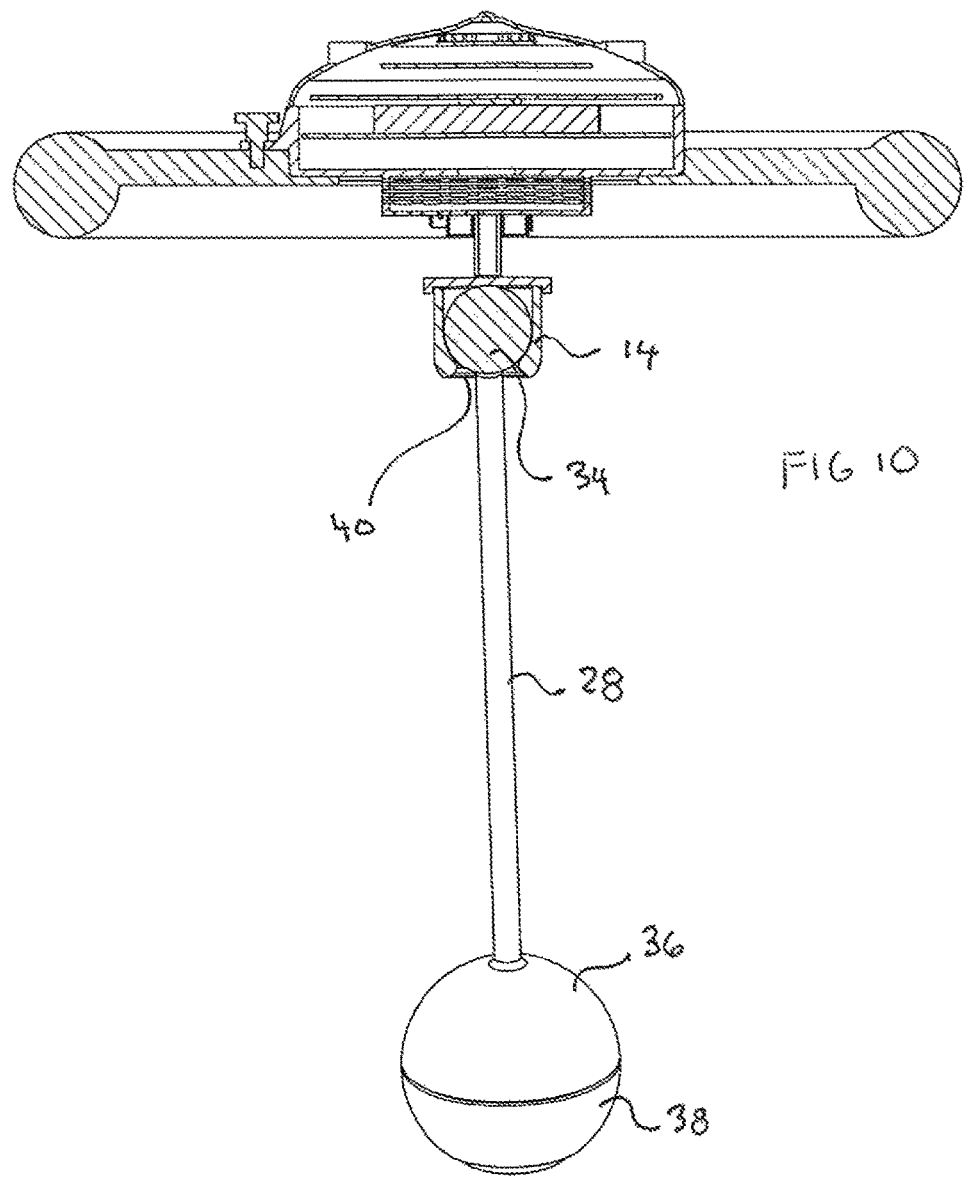
FIG. 10 is a cross sectional view through sectional line B-B.
Figure 9:
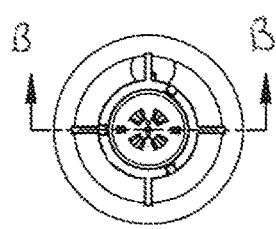
FIG. 9 is a top view of the pool sensor and float assembly showing section line B-B.
Figure 15:
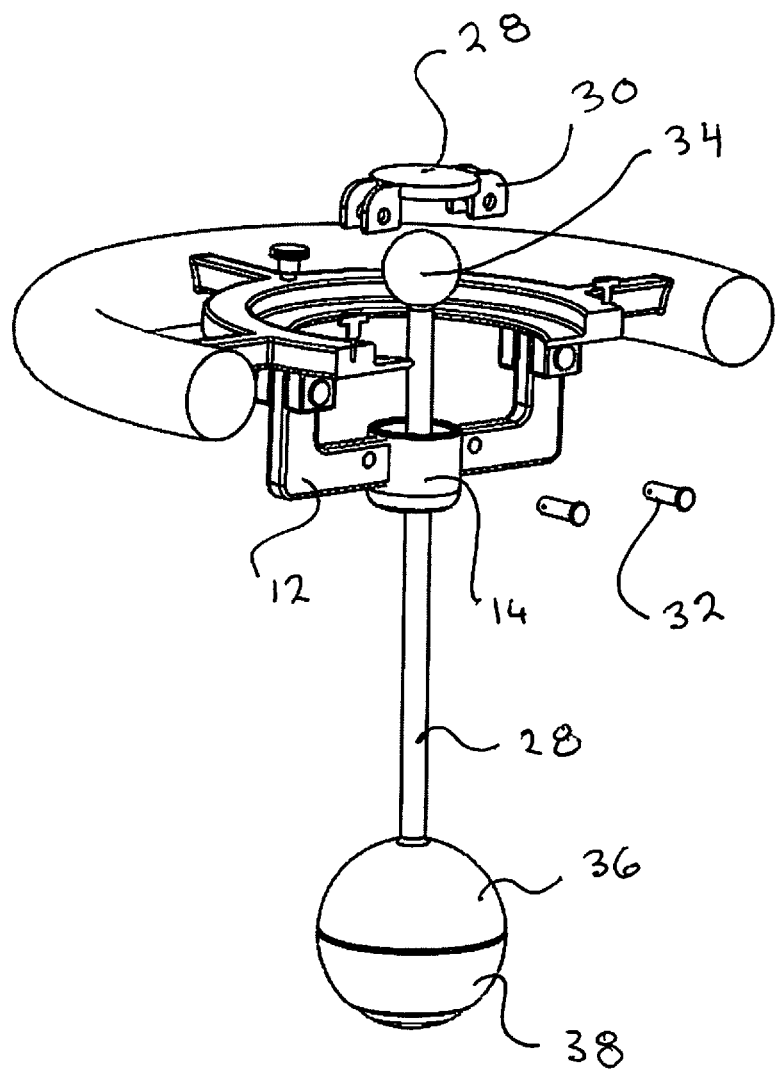
FIG. 15 is a perspective cutaway assembly view of the float assembly.

Looking at FIGS. 4-6 it can be seen that pool sensor and alarm unit 6 has a circular shell 40. This shell separates into two parts, an upper shell 42 with a convex, domed top face 42 having numerous through vents 44 and orifices through which different monitoring sensor components extend therethrough, and a lower shell 50. This allows access to replace the battery pack 46 or any of the printed circuit boards. There is a battery pack 46 (FIG. 8) affixed therein. In the shell 40 above the battery pack 46 are housed the internal electronics of the various sensors and components. These sensor electronics are arranged on a stacked set of three printed circuit boards (PCBs) 52, 54 and 56 which houses among other operational components, the microprocessors for the various sensors and battery monitoring system. Below the battery pack 46 are the chemical sensors 76 that extend from the chemistry module 78. (FIG. 8)

The cross-sectional view of FIG. 8 taken through section line A-A of FIG. 7 shows how the upper PCB 52, middle PCB 54 and bottom PCB 56 are nested in the upper shell 42, including the domed face volume. The PCBs increase in size from top to bottom to accommodate the diminishing diameter of the domed configuration of the upper shell 42. Although not depicted for visual clarity, there are mechanical polymer standoffs that set the spacing between the three PCBs to eliminate any mechanical interference between components, to minimize the electronic cross interference between components and to ensure adequate heat removal from the components. Generally, these are just small legs extending normally from the faces of the PCBs. The electrical connection from the battery to the power distribution plate to the various sensor electronics on each PCB are routed through or on these standoffs.

The battery pack 46 is formed as a circular disk affixed to the center of the bottom face 58 of the upper shell 42. On the front (internal) face of the battery pack is an interface electronic connector 60 that connects to a power distribution plate on the bottom PCB 56. This power distribution plate takes the DC power from the battery pack 46 through the interface electronic connector 60 and provides it to the various sensors, alarms, wireless signal/data transmitters and microprocessor circuits on the three PCBs.

Looking at FIGS. 4 to 8 and 16-22 the role of the three PCBs can best be explained. The bottom PCB 56 is the largest PCB. On it is centrally housed the power distribution plate 99 (which delivers the proper current and voltage to all the electronic modules and microprocessor in the shell from the battery pack), the audible piezoelectric siren speaker module 62, the wireless transceiver 64, the cellular network transceiver module 97, the two-way audible communication system 66, the video module 94, the battery power module 92, and the Z-wave module (hub functionality) 90.

The middle PCB 16 has the lower camera module 88, the alarm LED lights and module 86, the piezoelectric alarm module 84 and the central microprocessor 100.

The top PCB has a 360-degree fish eye camera and module assembly 68, a 360-degree motion sensor 70 (preferably a passive IR sensor) and a 360-degree proximity sensor 72 (preferably an ultrasonic or infrared sensor) and optionally a battery status indication module.

From the bottom face of the shell 40 extends normally, a vented cage 74 that protects a series of different chemical sensors 76 that are operably connected and extend from the chemistry module 78. The individual chemical sensors 76 are selected from the set of chemical sensors including pH, Chlorine, total alkalinity and acid demand, which are the generic tests of pool water quality. The chemistry module 78 interprets the various chemical sensor's output signals and then transmits them as concentrations in the pool water to the central microprocessor for relay to the owner's smart phone. The application on the user's smart phone will display these concentrations with reference to the optimal levels and provide a tactile interface to contact a chemical dispersion unit at the pool to correct the water chemistry.

The venting on the cage allows for the free flow of water and also helps to stabilize the device with the mass of the water entrained therein.

In operation, all modules for the independent subsystems are operationally connected to the microprocessor that functions to examine their various data/signal inputs and process these data/signal inputs as per the set of instructions installed and running on the microprocessor. These instructions include setting off a local alarm, initiating an intruder alarm message to the owner's smart device (phone) via the cellular transceiver 97, initiating an alarm to a monitoring service system's computer via the wireless transceiver 64, interpreting a data signal and providing pool chemistry values to the owner's smart device or a feed signal to a local chemical distribution device, providing a video feed from the fish eye camera 68 or the underwater camera assembly 38 to the owner's smart device or the monitoring service system's computer, or lastly initiating communication with the two-way audible communication system 66.

The monitor 2 looks for an unwanted intruder in the pool area with two different sensors; the motion sensor 70 and proximity sensor 72. It is to be noted that the motion sensor alone is not enough to give a positive verification of an intruder. Since it detects motion relative to itself, it will sense a body moving in its field of view, or a stationary body in its field of view when the sensor is moving. Theoretically, when someone enters the pool area then enters the water, both sensors will detect them by their physical movement or heat signature (depending on which type of proximity sensor is employed) and by their waves rocking the float assembly 4. However, when the wind is blowing waves in the pool will cause the motion detector to sense relative movement with the surroundings. For this reason, the monitor 2 has the redundancy with two different types of sensors looking for unauthorized pool area entry. When either one detects motion above their preset threshold for background motion, they signal the microprocessor 100 which sends an alert message to the owner's smart phone via the cellular network transmitter module 88 and to any linked computers (such as would be the case with a pay-for-use remote monitoring service) via the internet via the wireless transmission module 64. (Depending on the proximity to a WIFI enabled modem, a powered Wi-Fi 33 booster or extender may need to be installed near the pool area.)

At the same time, the microprocessor 100 initiates the live video feeds (and optional video recordings) from both the 360-degree fish eye camera and module 68 and the underwater video camera assembly 38 through its underwater camera video module 88. It provides both of these live video feeds to the owner's smart phone and to any linked computer systems as above. The home owner or remote computer operator, after verifying an unauthorized entry has occurred into the pool area and/or pool through the video feeds has several options. They may speak through their smart phone or computer enabled microphone and via the microprocessor 100 and the emergency response module 66, they may select on their smart phone or connected computer to initiate the local piezoelectric siren speaker 62 and the flashing alarm LED lights on the LED alarm module 86, or simply call the authorities. The Z wave module 90 just presents another pathway to get the alert message to the owner or monitoring company.

With the sensor and alarm unit 6 connected to the internet and the cellular network, signals can be sent in more than one way to a smart phone. Since the video and audio modules are also connected to the Z wave module 90 (hub), the home owner may talk to people or just eves drop on conversations/sound at the pool. If so desired the underwater camera's video feed can be initiated from the user's smart phone, Aside from its security and safety features, the monitor 2 also allows the water chemistry of the swimming pool to be monitored. At preset timed intervals the pool chemistry sensors will collect data for transmission to the owner's phone application. This data can be saved for further analysis or pushed to a remote chemical dosing unit near the pool, that disperses chemicals into the pool based on the results of the chemical analysis.

It is envisioned that the integration with some of the commercially available digital assistants such as Siri, Alexa, Google and the equivalent will be future enhancements. The feature of facial recognition integrated with the camera will be operable through the cell phone application. Lastly, there will be a Wireless Access Port and Wi-Fi Signal Repeater.

The concept herein being that pool intrusion and or entry into the water can be monitored or able to be monitored, from atop or below the waterline with multiple notifications sent when an this occurs to allow positive verification of an intruder so the owner can take the desired action. This monitor 2 can be set up, installed and maintained by any DIY person.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry as is the case in this monitor 2) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts. Thus, although depicted herein with a microprocessor it is known that in alternate embodiments the microprocessor 100 may not be incorporated as each module will have sufficient instructions to communicate through the appropriate communications modules to the owner's smart phone or any connected computer.

The following discussion is intended to provide a brief, general description of a suitable device in which certain aspects of the inventive concept can be implemented. Typically, the monitor includes a system bus to which is attached processors, memory, e.g., random access memory (RAM), read-only memory (ROM), or other state preserving medium, storage devices, at least one video interface, two-way audio communication and wireless communication devices. The monitor can be controlled, at least in part, by directives received from another device, or other input signal. As used herein, the term "monitor" is intended to broadly encompass a single device, or a system of communicatively coupled devices, or devices operating together.

The modules can include embedded controllers, such as programmable or non-programmable logic devices or arrays, Application Specific Integrated Circuits (ASICs), embedded computers, smart cards, and the like. The monitor can utilize one or more connections to one or more remote devices such as through a network interface, modem, or other communicative coupling. One skilled in the art will appreciate that network communication can utilize various wired and/or wireless short range or long-range carriers and protocols, including radio frequency (RF), satellite, microwave, Institute of Electrical and Electronics Engineers (IEEE) 545.11, Bluetooth®, optical, infrared, cable, laser, etc.

Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated.

While certain features and aspects have been described with respect to exemplary embodiments, one skilled in the art will recognize that numerous modifications are possible. System components described according to a particular structural architecture and/or with respect to one system may be organized in alternative structural architectures and/or incorporated within other described systems. Hence, while various embodiments are described with—or without— certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

What is claimed is:

1. A swimming pool monitoring device, comprising;
   a float assembly made of a cradle centered in a float ring, said cradle having a mounting bracket extending therefrom a bottom thereof and a ball socket centered on said mounting bracket, wherein said float ring is made of a water impervious material having a density less than water;
   an upper sphere connected to a lower counterweight by a linear rod, said upper sphere pivotally and rotatably constrained within said ball socket; and
   wherein said lower counterweight has a first mass greater than a second mass of said upper sphere so as to apply a counterforce to stabilize said float assembly when said float assembly encounters waves;
   a sensor and alarm unit removably mounted to a top side of said cradle;
   wherein said alarm unit has a microprocessor in communication with a sensor on said swimming pool monitoring device, and is connectable to an internet and a cellular network so when prompted by a signal from said sensor, can communicate an alert message to a cellular phone, smart device or computer.

2. The swimming pool monitoring device of claim 1, further comprising a 360-degree underwater camera assembly mounted on said lower counterweight.

3. The swimming pool monitoring device of claim 2, wherein said sensor and alarm unit has a separable, two-part shell made of an upper shell having a top face with at least one through vent and at least one top face orifice through which a monitoring component extends therethrough, and a lower shell, said shell housing a battery pack and at least one printed circuit board therein, said at least one printed circuit board having at least one sensor thereon operably connected to said battery pack.

4. The swimming pool monitoring device of claim 3, further comprising;
   a 360-degree fish eye underwater camera assembly extending from said at least one top face orifice;
   a 360-degree proximity sensor extending through said at least one top face orifice;
   a 360-degree motion sensor mounted on said at least one printed circuit board;
   a cellular transceiver mounted on said at least one printed circuit board;
   a wireless transceiver mounted on said at least one printed circuit board;
   an audible siren speaker mounted on said at least one printed circuit board;
   a LED light alarm mounted on said at least one printed circuit board;
   a power distribution plate mounted on said at least one printed circuit board;

a two-way voice communication system mounted on said at least one printed circuit board; and a system microprocessor mounted on said at least one printed circuit board, said system microprocessor operably connected to said battery pack, said fish eye camera, said underwater camera, said proximity sensor, said motion sensor, said cellular transceiver, said wireless transceiver, said audible siren speaker, said LED light alarm, said power distribution plate, said two-way voice communication system so as to receive and communicate signals therebetween; wherein said microprocessor wirelessly presents and receives signals from said sensor and alarm unit to an application operating on a smart device.

5. The swimming pool monitoring device of claim 4, further comprising;

a vented cage extending from a bottom face of said lower shell;

a chemistry module connected to said microprocessor and to a series of chemical sensors extending therefrom, said chemistry module receiving and interpreting output signals from said chemical sensors as chemical concentrations in pool water and transmitting said chemical concentrations to said microprocessor for wireless transmission to said cellular phone, said smart device or said computer; and wherein said chemistry module is mounted on said at least one printed circuit board.

6. The swimming pool monitoring device of claim 1 wherein said cradle has central circular ring and a recessed circular support flange formed below a top of said ring and centered within said ring; and wherein said sensor and alarm unit resides thereon said support flange, mechanically affixed to said cradle.

7. The swimming pool monitoring device of claim 1 further comprising;

a set of components housed within said sensor and alarm unit including, a 360 degree motion sensor, a proximity sensor, an underwater camera assembly, an above water, 360 degree fish eye camera, at least one wireless communication device; and a microprocessor and a battery pack operably connected to said set of components wherein said microprocessor receives and transmits signals to and from said set of components and wirelessly communicates said signals to a remote device.

8. A swimming pool monitoring device, comprising;

a float assembly made of a cradle centered in a float ring, said cradle having a mounting bracket extending therefrom a bottom thereof and a ball socket centered on said mounting bracket, wherein said float ring is made of a water impervious material having a density less than water; and wherein said lower counterweight has a first mass greater than a second mass of said upper sphere so as to act as a weighted keel member to apply a counterforce to stabilize said float assembly when said float assembly encounters waves;

a sensor and alarm unit removably mounted to a top side of said cradle;

a 360-degree fish eye underwater camera assembly extending from said sensor and alarm unit;

a 360-degree proximity sensor extending from said sensor and alarm unit;

a 360-degree motion sensor mounted on said sensor and alarm unit;

wherein said sensor and alarm unit has a microprocessor in communication with said underwater camera assembly, said proximity sensor, said motion sensor, and is connectable to an internet and a cellular network by a wireless transmission device, so when prompted by a signal from any sensor, can communicate an alert message to a cellular phone, smart device or computer, or can provide a live video feed from said underwater camera.

* * * * *